March 19, 1929.  O. BALLERT  1,705,892
TIPPING DEVICE FOR VEHICLES
Filed May 20, 1925  4 Sheets-Sheet 1

March 19, 1929.  O. BALLERT  1,705,892
TIPPING DEVICE FOR VEHICLES
Filed May 20, 1925  4 Sheets-Sheet 3

Inventor:
Otto Ballert
By (signature)
Attorney

Patented Mar. 19, 1929.

1,705,892

UNITED STATES PATENT OFFICE.

OTTO BALLERT, OF BERLIN, GERMANY.

TIPPING DEVICE FOR VEHICLES.

Application filed May 20, 1925, Serial No. 31,663, and in Germany May 21, 1924.

The invention relates to three-way tipping devices, with a horizontally arranged working piston, for vehicles and more particularly for motor lorries, in which all parts of the apparatus are controlled from one point, and by means of one operating lever only, in such a manner, that prior to the starting proper of the hydraulic raising or tipping device, those parts are actuated which are requisite for the tipping operation, namely, (1) the pressure pump, (2) the automatic locking of the control member, (3) the unlocking of the support bolts, which must be unlocked for the intended tipping, (4) the automatic engaging of the spring supporting device, (5) the unlocking or release of the discharge flaps of the truck or lorry box, (6) the automatic arrest of the tipping device in the highest position and (7) the automatic cutting-off of the pump, or shutting-off of the pressure fluid.

One form of construction of the invention is illustrated in the accompanying drawings, in which:—

Fig. 8 shows on an enlarged scale the tipping device in plan view (the working cylinder, control cylinder and support-bolts being shown in section) for effecting rear tipping.

Figs. 8ª and 8ᵇ are sections on the line I—II in Fig. 8, through the locking cylinder, with the control piston in the unlocked and locked position respectively;

Figs. 8ᶜ, 8ᵈ and 8ᵉ are sections through the control cylinder on the line A—B in Fig. 8, corresponding to the positions of the lever for lowering, travelling and raising respectively, Fig. 9 shows the position of parts during lateral tipping, to the right, corresponding to Figs. 3 and 4, and Fig. 10 shows the position of parts during the travelling position corresponding to Figs. 5, 6 and 7.

Figs. 9ª, 9ᵇ and 9ᶜ are sections on the line C—D in Fig. 9 when lowering, travelling and raising, respectively.

Figs. 9ᵈ, 9ᵉ and 9ᶠ are sections on the line A—B in Fig. 9 in the lowering, travelling and raising positions respectively.

Fig. 10ª is a section on the line C—D, Fig. 10,

Fig. 10ᵇ is a section on the line E—F, Fig. 10, and

Fig. 10ᶜ is a section on the line A—B, Fig. 10.

Figures 1, 2:
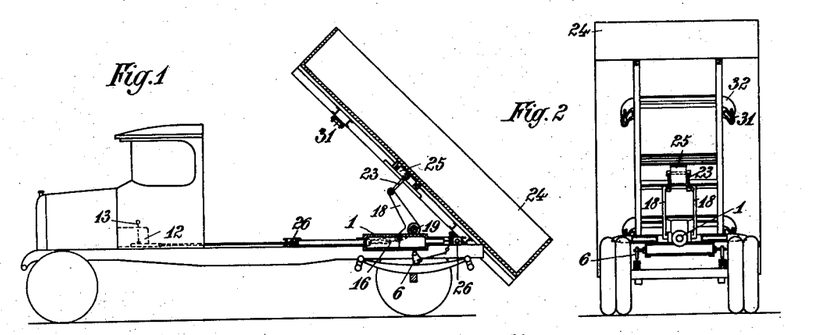
Figs. 1 and 2 show in side and front elevation respectively the tipping device, in the rearward-tipping position.
Figure 3:
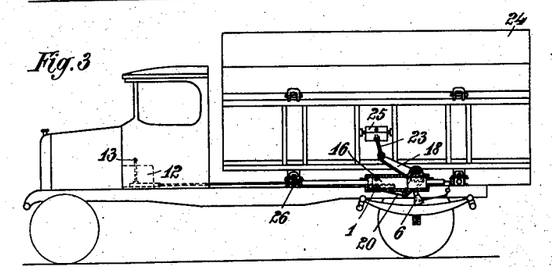
Figs. 3 and 4 show in side and front elevation the tipping device, in the lateral tipping position to the right.
Figure 4:
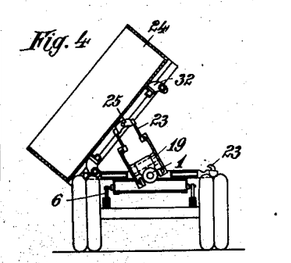
Figure 5:
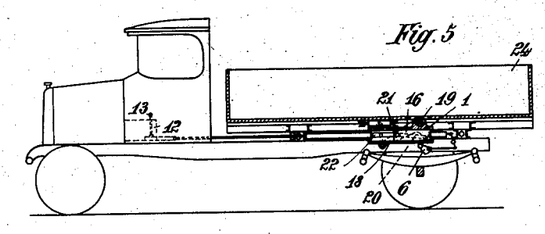
Figs. 5, 6 and 7 show in side, front and plan view respectively a lorry, provided with the invention, in traveling position.
Figure 6:
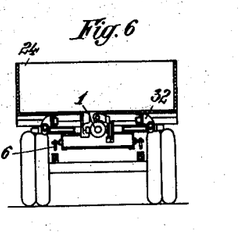
Figures 8, 8A, 8B, 8C, 8D, 8E:
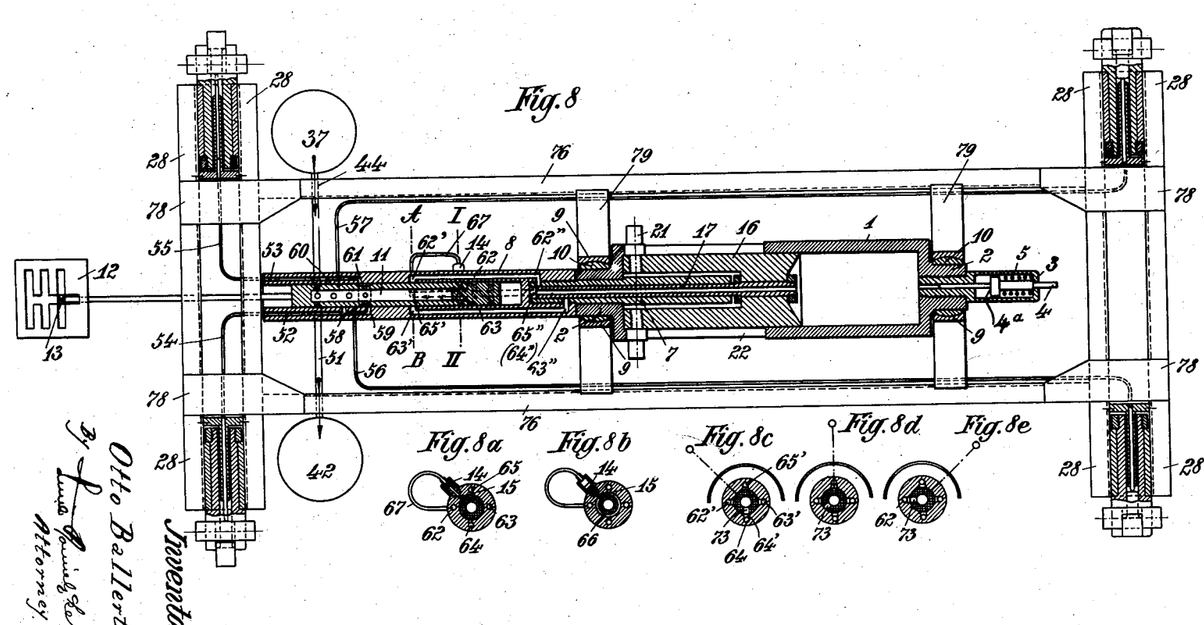
Figures 9, 9A, 9B, 9C, 9D, 9E, 9F:
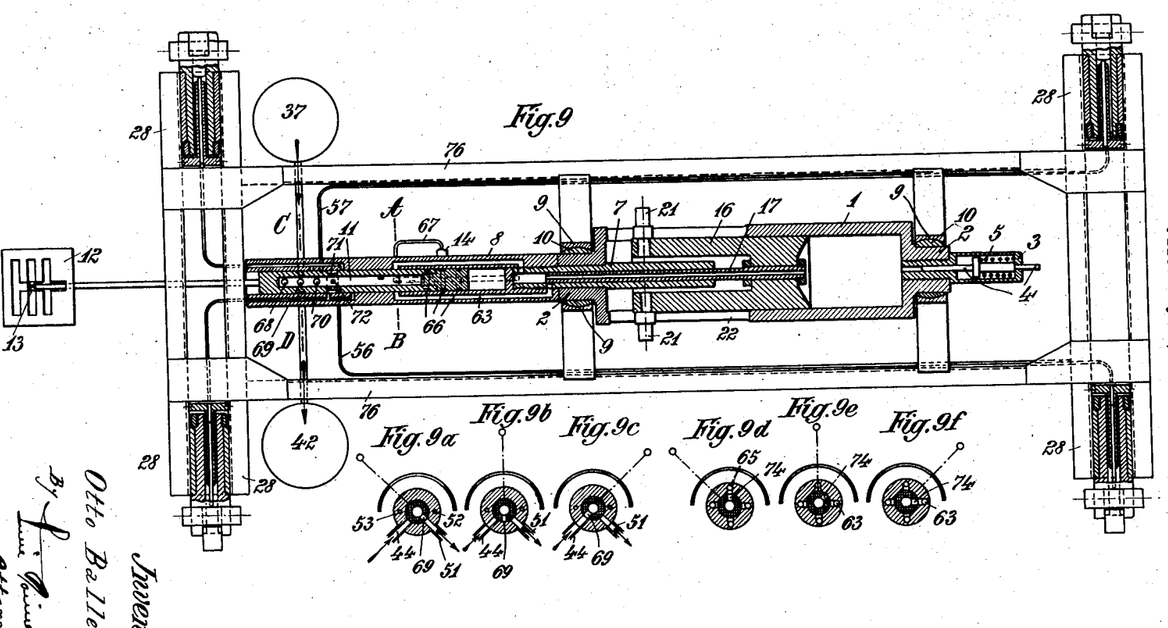
Figures 10, 10A, 10B, 10C:
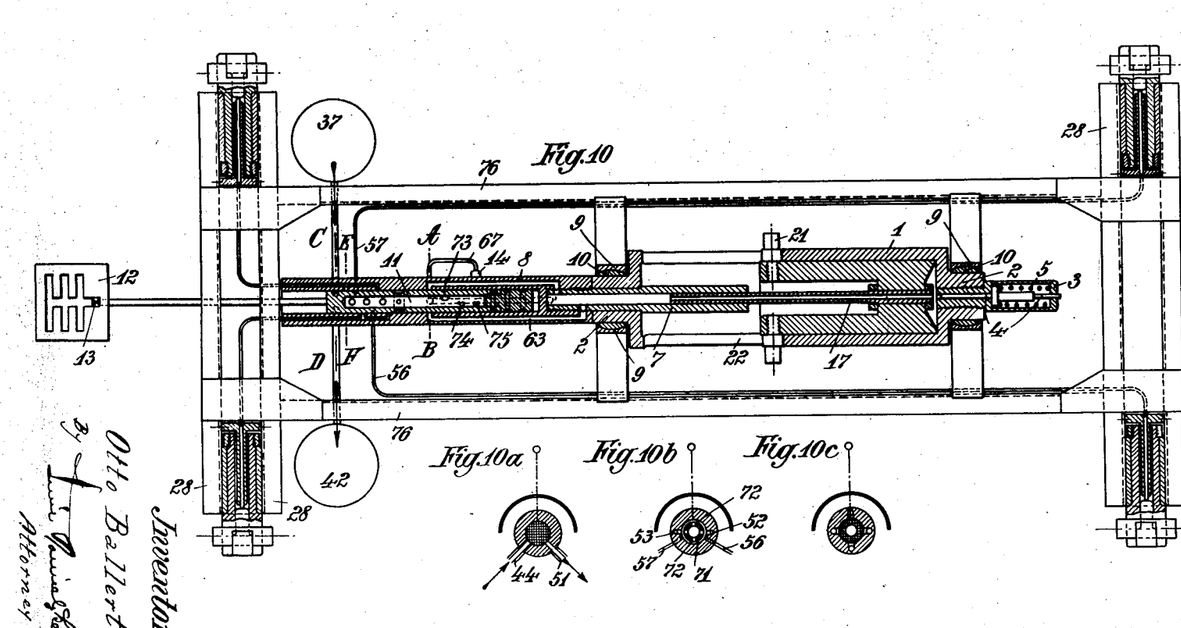

The horizontally arranged working cylinder 1 is rotatably journalled on two pivots or trunnions 2, at its ends, each having a longitudinal bore (Figs. 8, 9, 10). A small cylinder 3 is screwed into the bore of the rear pivot 2 and houses a long, rod-like piston 4 which, by means of a spring 5, may be driven forward towards the cylinder 1 until its collar 4ª strikes the end of the cylinder 3. The dimensions are so chosen that the front end of the piston 4 does not enter the interior of the cylinder 1 when in its extreme forward position, as shown in Fig. 10. The support 6 (Figs. 1 and 2) and the releasing device (not shown) for the discharge flaps of the wagon are actuated by the movement of the piston 4. The supporting device 6 is controlled by a piston 4 which is actuated or controlled by a spring 5 when the piston is not under the pressure influence of the fluid medium in the working cylinder 1. The piston 4 is operatively connected to the device 6 by suitable levers as shown in Figs. 1 and 3.

A guide tube 7, entering the working cylinder 1, is rotatably journalled in the bore of the front pivot 2, and has attached to its front end a control cylinder 8. This cylinder and the guide tube 7 are stationary, whereas the working cylinder 1, together with its pivots 2, is rotatable around its longitudinal axis in the bearings 9. The pivots 2 are provided with spherical journals 10, in order to prevent a jamming of the pivots due to flexure of the chassis while travelling.

The control cylinder 8 is open at its front end and is provided with a hollow longitudinally movable control piston 11. The latter can be moved into four positions—corresponding to the position for travelling, rearward tipping, lateral tipping to the right and lateral tipping to the left—by moving it longitudinally by means of a hand-operated lever 13, fulcrumed in a selector plate or gate 12. The control piston 11 may, moreover, when in the three last named positions be turned about its axis to the right or left by moving the hand lever 13 into the corresponding transverse slots in the gate 12 (Figs. 8–10), whereby the inlet or outlet ports of the cylinder become uncovered. Bores and channels are provided in the control piston and in the wall of the control cylinder for effecting the necessary connections between the control cylinder 8 and the working cylinder 1, and between the points of rotation in accordance with the horizontal displacements and the rotation of the control piston 11. Mounted in the control cylinder 8 is, moreover, a small locking cylinder 14, with a spring loaded piston 15, (Figs. $8^a$, $8^b$) for locking the control piston 11 against horizontal displacement so long as there is fluid under pressure in the channels or in the cylinders. Consequently a fresh tipping of the truck or box can only be effected after the preceding tipping has been correctly concluded.

In the working cylinder 1 is a hollow or tubular piston 16, having in turn a tubular piston 17 of small diameter, fitting within the guide tube 7, the bore in the inner piston 17 serving to supply pressure fluid to the rear of the working piston 16. The front end of the small piston 17 closes, in its extreme front position, the connection for rearward tipping as shown in Fig. 8 or, when in the position shown in Fig. 9, the connection for lateral tipping, and thereby causes an automatic cut-off when the parts are in the upper tipping positions.

The reversing of the horizontal movement of the working piston from the rear to the front, to produce the vertical raising movement of the truck, is effected by means of two bell-crank levers 18, having their common axle 19 mounted on the rear portion of the working cylinder 1 (Figs. 1 to 4). Arms 20 serve for connecting the two short arms of the levers 18 with the working piston 16, which for this purpose is provided at its front end with two pivots 21, which latter are guided in slots 22 in the working cylinder 1 (Figs. 8, 9, 10). Two struts 23 serve for connecting the long arms of the levers 18 with the head 25, arranged at the centre of gravity of the lorry box 24 (Figs. 1 to 4).

Figure 7:
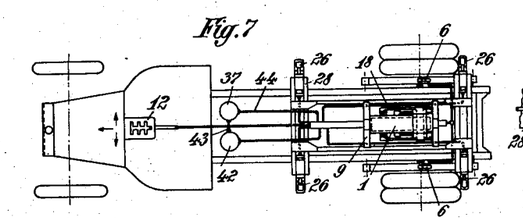
Figure 11:
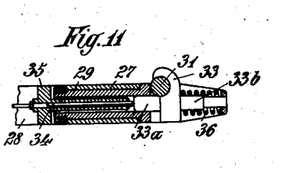
Figs. 11, 12 and 13 show the tipping bearing for a support bolt for the lorry box in longitudinal section, front view and plan view respectively.
Figures 12, 13:
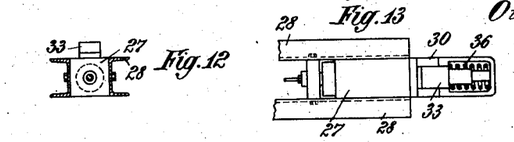

The tipping bearings 26 (Fig. 7) of the lorry-box are uniformly constructed. The bearing casing 27, (Figs. 11 to 13) of each tipping bearing 26 is situated between two U-beams 28, and is secured thereto by suitable means, such as bolts. Mounted in a bore in the casing 27, and secured so that it cannot drop out, is a hollow cylinder, forming the pivot 29 for the oscillating bearing 30 (Fig. 13) in which the support bolts 31 (Fig. 11) mounted on the lorry box by means of the brackets 32, are journalled during the travelling position. The bearing 30 is situated at right angles to the pivots 29 and is open at the top, in order to enable the corresponding support bolt 31 on the bracket 32 to move freely when a locking-hook 33 has released the bolt 31 when tipping is to be effected. The locking hook 33 is provided with two cylindrical projections $33^a$ and $33^b$, the former serves for guiding the locking hook in the rear end of the cylindrical pivot 29, the latter for its guiding in a head on the bearing. Between the U-beams 28 is mounted a cylinder 35 which enters the inner cylindrical end of the pivot 29, and is connected with a rigidly mounted pressure tube. Within the cylinder 35, which is open at one end is housed a long piston 34 adapted to be pressed by the pressure fluid against the projection $33^a$ of the locking hook 33. The unlocking of the locking hook 33, against the action of a spring 36 is effected by the displacement of the piston 34, as soon as the pressure of the fluid has become sufficiently strong.

The locking of the locking hook, by means of the spring 36, is effected as soon as the pressure of the fluid sinks again. The spring must be sufficiently strong that a secure locking of the lorry-box is ensured during travel. This construction of the tipping bearings overcomes the difficulty caused by the fact that the lorry box has to take part in the flexing or movements of the chassis when travelling over bad roads. The known types of rigidly mounted tipping bearings, with cylindrical, and also those with spherical, pivot supports, do not yield to the bending movements of the lorry-box during travel. The result thereof is that the bearings become defective, not on account of tipping, but through the strains during travel.

The pressure supply pipe 44, issuing from a pressure-pump or a pressure-tank 37 (Figs. 7 to 10) leads to the control-cylinder 8 (Fig. 8), whereas the return pipe 51 leads from the control-cylinder to a collecting-tank 42, (Figs. $9^a$, $9^b$, $10^a$). Situated in the front portion of the control cylinder 8 are longitudinal channels 52 and 53, the free ends of which are connected with the front tipping bearings by means of pressure pipes 54, 55 (Fig. 8). Pressure pipes 56, 57, likewise connected with the front portion of the control cylinder 8, lead to the rear tipping bearings of the tipping device (Figs. 8 and $10^b$). Bores 58, 59, 60, 61, lead from the longitudinal channels 52 and 53 to the interior of the control cylinder 8; the rear portion of the latter being provided with four longitudinal channels 62, 63, 64, 65 (Fig. $8^a$). The channel 62 serves as supply channel during rear tipping, and the channel 63 as supply channel during lateral tipping, 64 and 65 are the return channels. Transverse channels 62', 63', 64', 65' situated in one plane, serve for connecting the front ends of the longitudinal channels 62, 63, 64, 65 with the interior of the control cylinder, whereas the rear ends of the longitudinal channels 62, 63, 64, 65 are situated in different planes, in such a manner that the transverse channels 64″ and 65″, forming the return channels, are situated in the same plane, whilst the transverse channels 62″ and 63″ are off-set thereto and are situated in different planes. The hollow control piston 11 is closed at its rear end (at the right in the drawings) and there provided with three annular recesses 66 (Figs. 8$^b$ and 9) into which the piston or locking pin 15 of the cylinder 14 may engage. The latter is supplied with pressure from the channel 62 by means of the pipe 67. The hollow control piston 11 is provided at its front portion with three bores 68, 69, 70 (Fig. 9) for making the connection between the supply pipe 44 and the interior of the piston, or between the interior of the piston and the return pipe 51, according to the position of the hand lever 13, so that they serve either as supply ports or return ports; that is to say the rear tipping takes place when the bore 68 is situated in the plane of the pipes 44, 51 (Fig. 8), while lateral tipping to the right is effected when the bore 69 is opposite the pipes 44, 51, and lateral tipping to the left is caused when the bore 70 is in connection with the pipes 44, 51. The control piston is in the position shown in Fig. 10 during the position for travelling, in which no bore is opposite the channels 44, 51.

The control piston 11 is provided, at the rear of said three bores, with an annular groove 71 which is connected with the interior of the piston by means of four bores 72, so that, when pressure fluid is present within the control piston 11, said fluid also flows into the annular groove 71. The groove serves for making connections with the corresponding supply channels for the tipping bearings of the tipping device at the various positions of the control piston. For rear tipping, as shown in Fig. 8, the pressure fluid passes through the channels 61, 53, 55 or 59, 52, 54, to the two front tipping bearings. In Fig. 9, (for lateral tipping to the right), the channels 58, 52, 54 to the left front tipping bearing and the channel 56 to the rear tipping bearing are unlocked. In lateral tipping position to the left, (not illustrated), the pressure fluid enters through the channels 60, 53, 55 to the right front tipping bearing and through the channel 57 to the right rear tipping bearing.

The control piston 11 is, moreover, provided at the rear of the annular groove 71 with three bores 73, 74, 75, (Fig. 10), serving for supplying pressure fluid to the longitudinal channels 62, 63, 64, 65, which, while the vehicle is travelling, are so situated that they do not register with the transverse bores 62′, 63′, 64′, 65′. During rear tipping (Figs. 8, 8$^c$, 8$^d$, 8$^e$), the bore 73 serves for completing the supply connection between the piston interior and the channel 62; during raising, (Fig. 8$^e$), and during lowering, (Fig. 8$^c$), on the contrary it serves to complete the return connection between the channel 64 and the interior of piston. During lateral tipping to the right, i. e. during raising (Fig. 9$^f$) the bore 74 serves for completing the connection between the interior of the piston and the channel 63, while during lowering (Fig. 9$^d$) the return channel 65 is connected by means of the bore 74 with the interior of the piston. During lateral tipping to the left, the bore 75 serves for connecting the interior of the piston with the supply and return channels.

On bringing the control piston, by means of the hand lever 13, from the travelling position (Fig. 10), in which the whole raising device is in the non-active position or position of rest into the position according to Fig. 8, (rear tipping), the bore 68 is brought to coincide with the supply and return channels 44, 51. The annular groove 71 serves for connecting the interior of the piston with the bores 61, 59; the bore 73 is situated in the plane of the bores 62′, 63′, 64′, 65′, and the first of the three recesses 66 is situated in the plane of the locking piston 14, 15. The pressure fluid, entering the interior of the piston through the supply channel 44 and the bore 68, passes through the bore 72 and the annular groove 71, in the aforesaid manner, to the front tipping bearings and unlocks them. The pressure fluid enters simultaneously into the locking cylinder 14, through the bores 73, 62′ and the supply pipe 67, whereby the locking piston 15 is pressed into the first recess 66 and thus locks the control piston 11. The pressure fluid entering at 62′ into the channel 62 passes through the bore 62″ into the interior of the guide tube 7 (Fig. 10) and through the bore of the piston 17 in front of the piston 16 of the working cylinder 1, which is, according to Fig. 10, still in the "travelling" position. Since, in this case, the small piston 4 has been pressed outwardly into the position shown in Fig. 8, whereby the support device 6 has been engaged and the release of the discharge flaps has been effected, the working piston 16 together with the piston 17 is pushed forward, until the front portion of the piston 17 has closed the bore 62″, after the termination of the stroke of the piston, and thereby has raised the lorry box into its highest tipping position. The supply of pressure fluid now ceases. The bore 68 of the control piston 11, which is still locked, is connected with the return channel 51 by turning the hand lever into the position for lowering. The weight of the lowering box presses the working piston automatically back into the travelling position (Fig. 10). The pressure fluid thereupon passes from the space in front of the piston 16 through the bore of the piston 16 and through the bore of the guide tube 7, through the bores 65″, 64, 65′, through the bore 73 into the interior of the control piston 11, and from there through the bore 68 and the tube 51 to the tank 42. The piston 34 of the two front tipping bearings and finally the piston 15 of the locking cylinder 14 are pressed back by the spring 36 on decrease of pressure. The tipping device is then ready again for travelling or in its inactive position and the control piston 11 can be pushed back into the initial position or pushed forward for a fresh tipping action.

The action is the same during lateral tipping to the right or to the left with the single exception that the supply of the pressure fluid to the working cylinder is effected through the bore 63″ (Fig. 8), which is so arranged that the cutting-off of the fluid by means of the piston 17 takes place sooner than during rear tipping, since the stroke is normally a shorter one, see Fig. 9.

This tipping device is therefore constructed so as to be "foolproof", that is to say, unauthorized or inexperienced persons cannot effect an action by means of which the tipping device might get damaged. As stated, two of the four tipping bearings of the lorry box must be unlocked prior to the raising force being thrown in. If this prior unlocking of the tipping bearings is not effected positively, damage to the tipping device may easily take place with careless handling. The throwing-in of the raising which in mechanically operated tipping devices or the opening of the inlet valves in hydraulically operated tipping devices must therefore be prevented until two tipping bearings are unlocked. Even in hydraulically operated tipping devices this positive unlocking of the tipping bearings has hitherto been effected by hand. This requires often considerable power, since in such an arrangement the rigidly journalled pivotal points have to be connected by long link-rods, which can easily become jammed, especially if the lorry stands on uneven ground. The mechanically operated tipping device must therefore be machined and mounted very precisely, especially when, in addition thereto, the throwing out of the raising device at the end position is combined with the spring-support and the unlocking of the flaps. The mounting of the individual parts and the experimental trial of the tipping device can only be effected on the chassis, and consequently takes considerable time.

All these drawbacks are avoided in the present invention in that all movements necessary for tipping are effected hydraulically, which renders it possible to arrange all devices upon an integral, separate frame, which is to be secured to the chassis of the lorry. This frame is composed of longitudinal beams 76, of rolled sectional iron, with transverse beams 28 of the same kind, the ends of which are connected, in known manner, by means of corner members 78. The tipping bearings for the support bolts of the lorry box are mounted between the ends of the transverse beams 28. Other transverse beams 79, for carrying the pressure cylinder, are provided at suitable points between the longitudinal beams 76. The essential parts of the hydraulic pressure and control device with the essential conduits are mounted on this integral frame.

I claim:—

1. A hydraulic tipping device for vehicle bodies comprising a working cylinder; a working piston for the cylinder; means connected to the piston and the vehicle body for tipping said body; a control cylinder for the working cylinder; a control piston in the control cylinder adapted to be longitudinally and rotatably adjusted in its cylinder in order to control the movements of the vehicle body; and means controlled by the control piston and cylinder in order to allow tipping the body in the desired direction.

2. A hydraulic tipping device for vehicle bodies comprising a frame structure adapted to be secured to the frame of the vehicle; a working cylinder secured to said frame structure; a working piston for the cylinder; means connected to the piston and the vehicle body for tipping said body; a control cylinder for the working cylinder; a control piston in the control cylinder adapted to be longitudinally and rotatably adjusted in its cylinder in order to control the movements of the vehicle body; and means controlled by the control piston and cylinder in order to allow tipping the body in the desired direction.

3. A hydraulic tipping device for vehicle bodies comprising a working cylinder mounted to oscillate around its longitudinal axis; a working piston in said cylinder; means connected to the piston and the vehicle body for tipping said body; a control cylinder for the working cylinder; a rotary control piston in said control cylinder, said control cylinder and piston having a plurality of passages therein; and means for rotatably and slidably adjusting said control piston in its cylinder in order to provide registration of the required passages in the working piston and cylinder to thus actuate the vehicle body.

4. A hydraulic tipping device for vehicle bodies comprising a frame structure adapted to be secured to the frame of a vehicle; a working cylinder mounted in said frame structure adapted to oscillate around its longitudinal axis; a working piston in said cylinder; means connected to the piston and the vehicle body for tipping said body; a control cylinder for the working cylinder mounted in the frame structure; a rotary control piston in said control cylinder; said control cylinder and piston having a plurality of passages therein; and means for rotatably and slidably adjusting said control piston in its cylinder in order to provide registration of the required passages to thus actuate the vehicle body.

5. A hydraulic tipping device for vehicle bodies comprising a frame structure adapted to be secured to the frame of a vehicle; a working cylinder mounted in said frame structure adapted to oscillate around its longitudinal axis; a working piston in said cylinder; means connected to the piston and the vehicle body for tipping said body; hydraulic means for supplying fluid under pressure to the working cylinder; a control cylinder for the working cylinder mounted in the frame structure; a rotary control piston in said control cylinder, said control cylinder and piston having a plurality of passages therein to control the flow of fluid; and means for rotatably and slidably adjusting said control piston in its cylinder in order to provide registration of the required passages to thus actuate the vehicle body.

6. A hydraulic tipping device for vehicle bodies comprising a frame structure adapted to be secured to the frame of a vehicle; a working cylinder mounted in said frame structure and adapted to oscillate around its longitudinal axis; a working piston in said cylinder; means connected to the piston and the vehicle body for tipping said body; hydraulic means for supplying fluid under pressure to the working cylinder; a control cylinder for the working cylinder mounted in the frame structure; a rotary control piston in said control cylinder, said control cylinder and piston having a plurality of passages therein to control the flow of fluid; a plurality of locking devices on the frame structure and cooperating with the vehicle body; and means for rotatably and slidably adjusting said control piston in its cylinder in order to provide registration of the required passages to thus actuate the vehicle body and the necessary locking devices.

7. A hydraulic tipping device for vehicle bodies comprising a frame structure adapted to be secured to the frame of a vehicle; a working cylinder mounted in said frame structure and adapted to oscillate around its longitudinal axis; a working piston in said cylinder; means connected to the piston and the vehicle body for tipping said body; hydraulic means for supplying fluid under pressure to the working cylinder; a control cylinder for the working cylinder mounted in the frame structure; a rotary control piston in said control cylinder, said control cylinder and piston having a plurality of passages therein to control the flow of fluid; a plurality of locking devices on the frame structure and cooperating with the vehicle body; a locking device for the control piston adapted to lock the control piston in its adjusted position; and means for rotatably and slidably adjusting said control piston in its cylinder in order to provide registration of the required passages to thus actuate the vehicle body and the necessary locking devices.

8. A hydraulic tipping device for vehicle bodies comprising a frame structure adapted to be secured to the frame of a vehicle; a working cylinder mounted in said frame structure and adapted to oscillate around its longitudinal axis; a working piston in said cylinder; means connected to the piston and the vehicle body for tipping said body; hydraulic means for supplying fluid under pressure to the working cylinder; a control cylinder for the working cylinder mounted in the frame structure; a rotary control piston in said control cylinder, said control cylinder and piston having a plurality of passages therein to control the flow of fluid; a plurality of locking devices on the frame structure and cooperating with the vehicle body; a plurality of supply pipes connecting the hydraulic means with the passages in the control cylinder and connecting the passages with the locking devices; and means for rotatably and slidably adjusting said control piston in its cylinder in order to provide registration of the required passages to thus actuate the vehicle body and the necessary locking devices.

9. A hydraulic tipping device for vehicle bodies comprising a frame structure adapted to be secured to the frame of a vehicle; a working cylinder mounted in said frame structure and adapted to oscillate around its longitudinal axis; a working piston in said cylinder; means connected to the piston and the vehicle body for tipping said body; hydraulic means for supplying fluid under pressure to the working cylinder; a control cylinder for the working cylinder mounted in the frame structure; a rotary control piston in said control cylinder, said control cylinder and piston having a plurality of passages therein to control the flow of fluid; a plurality of locking devices on the frame structure and cooperating with the vehicle body; a locking device for the control piston adapted to lock the control piston in its adjusted position; a plurality of supply pipes connecting the hydraulic means with the passages in the control cylinder and connecting the passages with the locking devices; and means for rotatably and slidably adjusting said control piston in its cylinder in order to provide registration of the required passages to thus actuate the vehicle body and the necessary locking devices.

10. A hydraulic tipping device for vehicle bodies comprising a frame structure adapted to be secured to the frame of a vehicle; a working cylinder and piston mounted in said frame structure, said piston being adapted to actuate the vehicle body; a control cylinder and piston mounted in said frame structure; hydraulic means for supplying fluid under pressure to the cylinders; locking devices on said frame structure and cooperating with the vehicle body; and means for setting said control piston in its cylinder in order to control the movement of the vehicle body and to release the necessary locking devices.

11. A three-way hydraulic tipping device for vehicle bodies comprising a rotatably-mounted working cylinder; a working piston for the cylinder; means connected to the piston and the vehicle body for tipping said body; a control cylinder for the working cylinder; a control piston in said control cylinder, said control cylinder and piston controlling the movement of the operating fluid; means for setting said control piston in its cylinder; and body locks controlled by the control piston for controlling the movement of the vehicle body to execute any desired one of the three tipping movements of the vehicle body.

12. A three-way hydraulic tipping device for vehicle bodies comprising a working cylinder; a working piston for the cylinder; means connected to the piston and the vehicle body for tipping said body; a control cylinder for the working cylinder; a control piston in said control cylinder, said control cylinder and piston controlling the movement of the operating fluid; a lever for setting said control piston in its cylinder; and body locks controlled by the control piston for controlling the movement of the vehicle body to execute any desired one of the three tipping movements of the vehicle body.

13. A three-way hydraulic tipping device for vehicle bodies comprising a frame structure adapted to be secured to the frame of the vehicle; a working cylinder mounted in said frame structure; a working piston for the cylinder; means connected to the piston and the vehicle body for raising and tipping said body; a control cylinder for the working cylinder mounted in said frame; a control piston in said control cylinder, said control cylinder and piston controlling the movement of the operating fluid; means for setting said control piston in its cylinder; and body locks controlled by the control piston for controlling the movement of the vehicle body to execute any desired one of the three tipping movements of the vehicle body.

14. A three-way hydraulic tipping device for vehicle bodies comprising a working cylinder; a working piston for the cylinder; means connected to the piston and the vehicle body for raising and tipping said body; a control cylinder for the working cylinder; a control piston in said control cylinder, said control cylinder and piston controlling the movement of the operating fluid; means for setting said control piston in its cylinder; body locks controlled by the control piston for controlling the movement of the vehicle body to execute any desired one of the three movements of the vehicle body; and a source of hydraulic pressure for the working piston.

15. A three-way hydraulic tipping device for vehicle bodies comprising a working cylinder; a working piston for the cylinder; means connected to the piston and the vehicle body for raising and tipping said body; a control cylinder for the working cylinder; a control piston in the control cylinder adapted to be longitudinally and rotatably adjusted in its cylinder, said control cylinder and piston controlling the movement of the operating fluid; and body locks controlled by the control piston for controlling the movement of the vehicle body.

16. A three-way hydraulic tipping device for vehicle bodies comprising a frame structure adapted to be secured to the frame of a vehicle; a working cylinder and piston mounted in said frame structure, said piston being adapted to actuate the vehicle body; a control cylinder and piston mounted in said frame structure; hydraulic means for supplying fluid under pressure to the cylinders; and means controlled by the control piston to execute the desired one of the three tipping movements of the vehicle body.

17. A three-way hydraulic tipping device for vehicle bodies comprising a rotatably-mounted working cylinder; a working piston for the cylinder; means connected to the piston and the vehicle body for raising and tipping said body; a control cylinder for the working cylinder; a control piston in said control cylinder, said control cylinder and piston controlling the movement of the operating fluid; means for setting said control piston in its cylinder; body locks controlled by the control piston for controlling the movement of the vehicle body to execute any desired one of the three tipping movements of the vehicle body; and a supporting device controlled by a spring-actuated piston operated by the pressure medium in the working cylinder.

18. A three-way hydraulic tipping device for vehicle bodies comprising a working cylinder; a working piston for the cylinder; means connected to the piston and the vehicle body for raising and tipping said body; a control cylinder for the working cylinder; a control piston in said control cylinder, said control cylinder and piston controlling the movement of the operating fluid; means for setting said control piston in its cylinder; body locks controlled by the control piston for controlling the movement of the vehicle body to execute any desired one of the three movements of the vehicle body; a source of hydraulic pressure for the working piston; and a hydraulic supporting device controlled by a spring-actuated piston operated by the pressure medium in the working cylinder.

19. A three-way hydraulic tipping device for vehicle bodies comprising a frame structure adapted to be secured to the frame of a vehicle; a working cylinder and piston mounted in said frame structure, said piston being adapted to actuate the vehicle body; a control cylinder and piston mounted in said frame structure; hydraulic means for supplying fluid under pressure to the cylinders; means controlled by the control piston to execute the desired one of the three tipping movements of the vehicle body; and a supporting device controlled by a spring-actuated piston operated by the pressure medium in the working cylinder.

In testimony whereof I affix my signature.

OTTO BALLERT.